US00RE48027E

(19) United States
(12) Reissued Patent
Warner

(10) Patent Number: US RE48,027 E
(45) Date of Reissued Patent: Jun. 2, 2020

(54) ENVIRONMENTALLY FRIENDLY LIQUID CONTAINER AND METHOD OF MANUFACTURE

(71) Applicant: Double Double D, LLC, Burlington, KY (US)

(72) Inventor: Jim F. Warner, Chicago, IL (US)

(73) Assignee: Double Double D, LLC, Burlington, KY (US)

(21) Appl. No.: 16/195,325

(22) Filed: Nov. 19, 2018

Related U.S. Patent Documents

Reissue of:
(64) Patent No.: 9,090,372
Issued: Jul. 28, 2015
Appl. No.: 14/252,138
Filed: Apr. 14, 2014

U.S. Applications:
(63) Continuation-in-part of application No. 12/641,731, filed on Dec. 18, 2009, now Pat. No. 8,701,905.
(Continued)

(51) Int. Cl.
*B65D 1/02* (2006.01)
*B65D 6/00* (2006.01)
(Continued)

(52) U.S. Cl.
CPC ..... *B65D 1/0215* (2013.01); *B65D 13/04* (2013.01); *B65D 25/14* (2013.01); *B65D 39/088* (2013.01);
(Continued)

(58) Field of Classification Search
CPC .... B65D 1/0215; B65D 13/04; B65D 65/466; B65D 75/322; B65D 39/088; B65D 41/06;
(Continued)

(56) References Cited

U.S. PATENT DOCUMENTS 1,328,317 A * 1/1920 Claussen ..... B65D 13/04 229/406
2,090,699 A 8/1937 Plunkett
(Continued)

FOREIGN PATENT DOCUMENTS

EP 0210428 A2 2/1987
EP 0538176 A1 4/1993
(Continued)

OTHER PUBLICATIONS

Dave Sattler "Find a Brand for this Paper Water Bottle" Ecopreneurist, Dec. 9, 2008 (Dec. 9, 2008), XP002674688, Retrieved from the Internet: URL: http://ecopreneurist.com/2008/12/09/find-aa-brand-for-this-paper-water-bottle/ [retrieved on Apr. 20, 2012].
(Continued)

*Primary Examiner* — William C Doerrler
(74) *Attorney, Agent, or Firm* — Dinsmore & Shohl LLP

(57) ABSTRACT

A container for liquids comprising a first portion forming an approximate half container portion; a second portion forming an approximate half container portion, the first and second portions having a generally convex exterior shape with flange portions along perimeters thereof; a liquid impermeable barrier film being disposed on a concave interior portion of each of the first and second portions and extending onto the flange portions; the first and second portions being sealed together at the flange portions to form a liquid impermeable container; and there being provided a location on the container for the disposition of a closure device to allow contents of the container, once filled, to be removed.

24 Claims, 17 Drawing Sheets

Related U.S. Application Data

(60) Provisional application No. 61/162,444, filed on Mar. 23, 2009, provisional application No. 61/139,204, filed on Dec. 19, 2008.

(51) Int. Cl.

| | |
|---|---|
| ***B65D 65/46*** | (2006.01) |
| ***B65D 75/32*** | (2006.01) |
| ***B65D 41/06*** | (2006.01) |
| ***B65D 39/08*** | (2006.01) |
| ***B65D 85/72*** | (2006.01) |
| ***B65D 75/58*** | (2006.01) |
| ***B65D 25/14*** | (2006.01) |
| ***B29L 31/00*** | (2006.01) |

(52) U.S. Cl.

CPC ..... *B65D 41/06* (2013.01); *B65D 65/466* (2013.01); *B65D 75/322* (2013.01); *B65D 75/5811* (2013.01); *B65D 85/72* (2013.01); *B29L 2031/7158* (2013.01); *B65D 2565/386* (2013.01); *B65D 2575/586* (2013.01); *Y02W 30/805* (2015.05); *Y10S 229/933* (2013.01); *Y10S 229/935* (2013.01)

(58) Field of Classification Search

CPC .... B65D 85/72; B65D 75/5811; B65D 25/14; B65D 2575/586; B65D 2565/386; Y02W 30/805; B29L 2031/7158

USPC ..... 215/334; 220/288, 304, 678, 679; 229/117.27; 428/421.1, 34.2, 34.3; 493/93, 95, 96, 100

See application file for complete search history.

(56) References Cited

U.S. PATENT DOCUMENTS

| | | | | | |
|---|---|---|---|---|---|
| 2,460,820 | A | * | 2/1949 | Hagopian | 493/96 |
| 2,590,221 | A | * | 3/1952 | Stevens | 156/196 |
| 3,119,543 | A | * | 1/1964 | Walker | 229/117.3 |
| 3,176,879 | A | * | 4/1965 | Mojonnier | 222/143 |
| 3,226,002 | A | * | 12/1965 | Walker | B65D 39/08 229/117.3 |
| 3,318,748 | A | * | 5/1967 | Hurst | 156/224 |
| 3,390,816 | A | * | 7/1968 | Mojonnier | 222/153.07 |
| 3,510,054 | A | | 7/1968 | Sanni et al. | |
| 3,616,197 | A | * | 10/1971 | Amberg et al. | 428/201 |
| 3,658,615 | A | * | 4/1972 | Amberg | 156/218 |
| 3,898,310 | A | * | 8/1975 | Schiemann | 264/512 |
| 3,912,080 | A | * | 10/1975 | Winberg | 383/38 |
| 3,947,617 | A | * | 3/1976 | Gerek et al. | 220/62.12 |
| 3,957,558 | A | * | 5/1976 | Lee et al. | 156/212 |
| 4,078,715 | A | * | 3/1978 | Larsson et al. | 229/216 |
| 4,256,231 | A | * | 3/1981 | Cioc et al. | 215/12.2 |
| 4,298,045 | A | | 11/1981 | Weiler et al. | |
| 4,460,348 | A | * | 7/1984 | Iioka et al. | 493/108 |
| 4,483,464 | A | * | 11/1984 | Nomura | 222/83 |
| 4,709,825 | A | * | 12/1987 | Mumford | 215/318 |
| 4,723,677 | A | * | 2/1988 | Nagel, Jr. | 215/330 |
| 4,732,299 | A | * | 3/1988 | Hoyt | 222/94 |
| 5,009,939 | A | * | 4/1991 | Goldberg | 428/34.2 |
| 5,108,382 | A | * | 4/1992 | Wright et al. | 604/342 |
| 5,122,399 | A | * | 6/1992 | Farrell et al. | 428/34.2 |
| 5,169,470 | A | * | 12/1992 | Goldberg | 156/244.14 |
| 5,191,988 | A | * | 3/1993 | Reil et al. | 220/4.24 |
| 5,220,129 | A | | 6/1993 | Nishio et al. | |
| 5,232,107 | A | * | 8/1993 | Krall et al. | 215/398 |
| 5,613,779 | A | | 3/1997 | Niwa | |
| 5,679,109 | A | * | 10/1997 | Gics | 493/100 |
| D397,292 | S | * | 8/1998 | Tabaroni et al. | D9/696 |
| 5,866,172 | A | * | 2/1999 | Parks | 425/72.1 |
| 5,968,616 | A | * | 10/1999 | Kakemura et al. | 428/34.2 |
| 6,142,344 | A | * | 11/2000 | Kai | 222/183 |
| 6,422,753 | B1 | | 7/2002 | Thomas | |
| 6,626,308 | B2 | * | 9/2003 | Weiler | 215/48 |
| 6,685,789 | B1 | * | 2/2004 | Wissing | 156/212 |
| 7,048,132 | B2 | * | 5/2006 | Yamanaka et al. | 215/381 |
| 7,048,975 | B1 | * | 5/2006 | Tojo | B65D 1/0207 428/213 |
| 8,096,448 | B2 | * | 1/2012 | Keller et al. | 222/107 |
| 2002/0132069 | A1 | * | 9/2002 | Kose et al. | 428/35.2 |
| 2007/0102320 | A1 | * | 5/2007 | Van Der Krogt et al. | 206/581 |
| 2007/0259139 | A1 | * | 11/2007 | Furneaux | 428/34.3 |
| 2007/0269622 | A1 | | 11/2007 | Chuprevich et al. | |
| 2008/0041810 | A1 | * | 2/2008 | Itoh et al. | 215/316 |
| 2008/0065210 | A1 | * | 3/2008 | McKay | 623/14.12 |
| 2010/0044267 | A1 | * | 2/2010 | Tolibas-Spurlock et al. | 206/524.7 |
| 2010/0054334 | A1 | | 3/2010 | Yoo et al. | |
| 2010/0084361 | A1 | * | 4/2010 | Dayton et al. | 215/40 |
| 2010/0200591 | A1 | * | 8/2010 | Myerscough | 220/495.05 |
| 2010/0252617 | A1 | * | 10/2010 | Dayton et al. | 229/4.5 |
| 2011/0089173 | A1 | * | 4/2011 | Patel | 220/200 |
| 2011/0180592 | A1 | * | 7/2011 | Green et al. | 229/4.5 |
| 2011/0220652 | A1 | * | 9/2011 | Corbett et al. | 220/495.03 |
| 2011/0290798 | A1 | | 12/2011 | Corbett et al. | |
| 2012/0097632 | A1 | * | 4/2012 | West et al. | 215/40 |

FOREIGN PATENT DOCUMENTS

| | | | | | |
|---|---|---|---|---|---|
| EP | 538176 | A1 | * | 4/1993 | B65D 23/08 |
| EP | 0692428 | A1 | | 5/1995 | |
| EP | 0768974 | A1 | | 4/1997 | |
| EP | WO9748619 | A1 | | 12/1997 | |
| EP | WO9810993 | A1 | | 3/1998 | |
| FR | 2722447 | A1 | | 1/1996 | |
| JP | 2005313986 | A | | 11/2005 | |
| WO | WO9601212 | A2 | | 1/1996 | |
| WO | WO9614254 | A1 | | 5/1996 | |
| WO | WO9748619 | A1 | | 12/1997 | |
| WO | WO9810993 | A1 | | 3/1998 | |
| WO | WO2010054334 | A2 | | 5/2010 | |
| WO | WO2010071815 | A1 | | 6/2010 | |

OTHER PUBLICATIONS

Miller, Ken and Warner, Jim; "The Consumer Trust Crisis: How package structure can help build brand confidence", Brandpackaging Magazine, pp. 13, 14, 16, Apr. 2005.

Extended Supplementary European Search Report from Appln. No. 09833840.3 dated Jun. 22, 2012.

Inventorspot.com, Dec. 2008, Forget Plastic! The Brilliant Invention of the 360 Paper Water Bottle [online], Copyright 2006-2020 [retrieved on Feb. 9, 2010]. Retrieved from the internet: URL: http:/inventorspot.com/articles/forget_plastic_brilliant_invention_360_paper_water_bottle_20997.

International Search Report and the Written Opinion of the International Searching Authority, or the Declaration from PCT/US2009/068766 dated Mar. 5, 2010, 11 pages.

Patent Examination Report No. 1, Australian Appl No. 2009327426, dated Aug. 10, 2012, 6 pages.

Canadian Office Action, Canadian Appl. No. 2,747,515 dated Nov. 6, 2012, 11 pages.

Official Action dated Dec. 18, 2009, Application No. 2011147470/12(071158), PCT Appl US2009/068766, 7 pages.

* cited by examiner

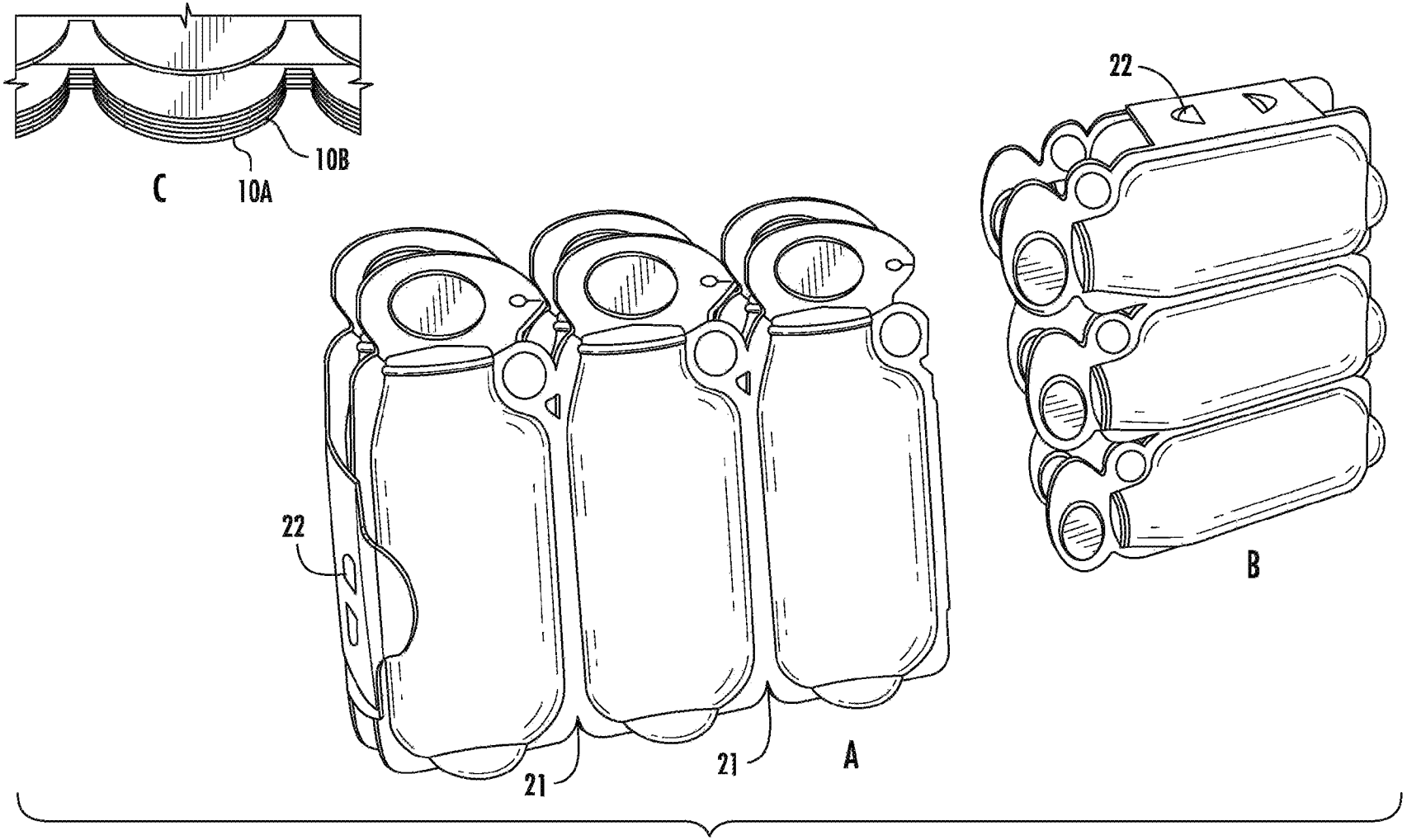
FIG. 4 (Amended)

ENVIRONMENTALLY FRIENDLY LIQUID CONTAINER AND METHOD OF MANUFACTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE

This application is a continuation in part of U.S. application Ser. No. 12/641,731 filed Dec. 18, 2009, which claims priority to Provisional Application No. 61/162,444 filed Mar. 23, 2009 and 61/139,204 filed Dec. 19, 2008, which are all hereby incorporated by reference in their entireties.

BACKGROUND

1. Field

The present invention relates to containers and in particular, to an environmentally/ecologically friendly container or bottle for liquids.

2. Technical Background

Landfills are filled with plastic bottles that may take years to degrade or which are non-biodegradable. This is because many plastics are not recyclable or they are not properly recycled. Many that are recyclable never reach recycling centers. A beverage company would find it desirable to use ecologically safe containers not only because of the ecological benefits in reusing materials, but because it would reinforce their public esteem.

SUMMARY OF THE INVENTION

The present invention provides an ecologically friendly container that is made of ecologically friendly materials may include agricultural processing materials, such as forms of bamboo, banana leaves, hay, grasses, cornstalks, etc. Some embodiments may include post-consumer waste, such as newsprint, packaging, other forms of paper products, etc. Some embodiments include composite materials, such as from landfill and/or municipal reclaim centers, including architectural wood, building materials, manufacturing byproducts, etc. One or more other ecologically friendly materials may be used, depending on the particular embodiment.

The design of the container addresses the containment of liquids, for example water or other liquids. The product according to the invention challenges the norms of production, shipping, filling, visible material, shelf impression, labeling, multi-packing, structural integrity, opening and resealing of the closure and ultimately its disposition. The package utilizes sustainable sheet stock of bamboo, palm leaves, etc. and/or other ecologically friendly material (such as described above) that is pressed into two halves to encapsulate a micro-thin PLA film that provides a liquid/oxygen barrier. The formed material provides the form, graphical substrate and/or embellishment surface and structural integrity. In one embodiment, the containers may be shipped partly inverted and pop open upon filling through a fill portal at the base. In another embodiment, the container is filled from a conventional screw cap or other conventional closure device, but which closure device is also made preferably of ecologically friendly materials. The barrier material also acts as the means to fuse the two container halves together.

In a first embodiment, a top component is torn off to access the liquid. To reseal, the removed component peels apart to expose a sanitary plug that acts as a closure for the container and the remaining part is tethered to a finger loop to eliminate litter. The invention changes the total experience of drinking water or other liquid from the way the container looks, feels, and functions to the way it ends its usage.

In a second embodiment, a conventional screw cap is employed, preferably made of the same ecologically friendly material as the container itself, but otherwise the container has similar advantages as the first embodiment.

In one embodiment, the container is filled through a portal at the base which is thereafter removed and sealed. In yet another embodiment, the container is filled with a novel screw cap closure device. The screw cap is preferably made of predominantly ecologically friendly materials.

In one embodiment of the container, the container is made from two body halves and the film barrier comprises two film sheets that are positioned adjacent the respective body halves of the container or through the use of an applied natural liquid barrier material and are disposed or affixed to concave inner portion of the resources body halves (before or after assembly). The entire assembly of the two body halves sandwiching the two barrier films or natural liquid barrier material is then sealed according to the methods described herein.

In another embodiment, a pre-sealed fill pouch made of the barrier material is sandwiched between the two container body halves and then sealed by a suitable sealing method. In this embodiment, since the fill pouch is already sealed, only a light intermittent seal of the two body halves to the film pouch is necessary, although a continuous seal could also be used.

According to one embodiment, the barrier film sections or fill pouch or natural liquid barrier material may be maintained in place during assembly to the container halves by, for example, an electrostatic charge placed on the film or container halves to create a liquid reservoir for the environmentally friendly container to prevent loss of liquid. In some embodiments, the barrier film may be created from a pre-sealed liquid container, which may be blow molded to the environmentally friendly container.

In the further embodiment having a screw cap, in order to minimize the content of polymeric material, the screw cap is preferably made of an environmentally friendly material, such as a biodegradable material, compostable material, recyclable material, such as paper or another ecological friendly material, a polymer liner or natural liquid barrier material is inserted into the screw cap which includes integral thread bearing portions which are moved into position when the liner is inserted into the screw cap. The screw cap may be constructed of the environmentally friendly material that includes a sealing liner for sealing to the closure fitment provided on the first environmentally friendly outer shell portion and the second environmentally friendly outer shell portion. The environmentally friendly material may include biodegradable materials, compostable materials, recyclable materials and/or other materials that may be reused, recycled, composted, or degraded in natural conditions within a predetermined amount of time (such as 100 years).

A sealed in threaded closure fitment either made of ecologically friendly materials or a polymeric component is also attached and sealed to the barrier film comprising the film pouch contained within the container to seal thereto and includes mating threaded elements to receive the thread bearing components of the liner.

The container according to the present invention is preferably used as a single serve container. An important aspect is that the design of the container enables the self-bundling of multiple containers to negate the use of a separate six-pack carrier. A shipping and merchandiser is also provided that uses an all natural structural board with vertical ends that drastically reduces the material used in pallettizing and enables self-merchandising.

Graphical brand communication media can be applied directly to the material, for example, by embossing or direct printing of natural dies and inks or application of labels.

BRIEF DESCRIPTION OF THE DRAWINGS

The invention will be described in greater detail in the following detailed description with reference to the drawings in which:

FIG. 1A shows a sectional view along the lines BB of FIG. 1B.

FIGS. 2A-2D show a second embodiment in which FIG. 2A shows a sectional view along the lines BB of FIG. 2B; FIG. 2B shows a front partially phantom view; FIG. 2C shows a left side view; and FIG. 2D shows a perspective view;

FIG. 4A shows a six-pack of the first embodiment; FIG. 4B shows the six-pack from another perspective; and FIG. 4C shows the container halves prior to filling;

DETAILED DESCRIPTION OF PREFERRED EMBODIMENTS OF THE INVENTION

With reference to the drawings, FIGS. 1A, B, C and D show a first embodiment of the invention. The invention comprises a container 10 that is made of an ecologically sensitive material such as bamboo, palm leaves or another paper product or any other ecologically considerate material, such as those described above. The container 10 comprises sections 10A and 10B. A barrier film 12 such as a micro-thin polymer/PLA/foil and/or laminate barrier sheet, polymer film, a polymer foil laminate, a liquid barrier material, or another suitable environmentally friendly plastic or other natural liquid barrier material is disposed on each container half on what will be the inside of the container. The two halves are bonded together at a joint 14, preferably by the barrier film 12. A closure device 16 is formed from two portions of the sections 10A and 10B which interlock together at the top of the container. The sealing portion of the closure device 16 comprises two portions 16A and 16B which interlock as shown. These two portions 16A and 16B are not fused together or are fused together only along the joint 14A where the barrier material is joined. Each container half 10A and 10B includes lateral side surfaces or flanges 10C and 10D which are sealed to each other along the joint 14 by the barrier film 12. This can be performed by suitable techniques depending on the film that is used such as by employing heat, pressure, radio frequency energy, bondable natural materials, inductive heating or an ecologically sensitive glue. The flanges 10C, 10D are maintained, i.e., not removed, in order to save energy during the manufacturing process and so as not to require a waste collection system, and the flanges increase container holding strength and integrity.

The closure device 16 is integrally formed with the sections 10A and 10B and includes a frangible connection 16D. The frangible connection, as will be explained later, allows the sealing portion to be removed by tearing from the sections 10A and 10B.

Preferably the container 10 includes a base portion 10E that allows the container to stand upright.

Figure 3:
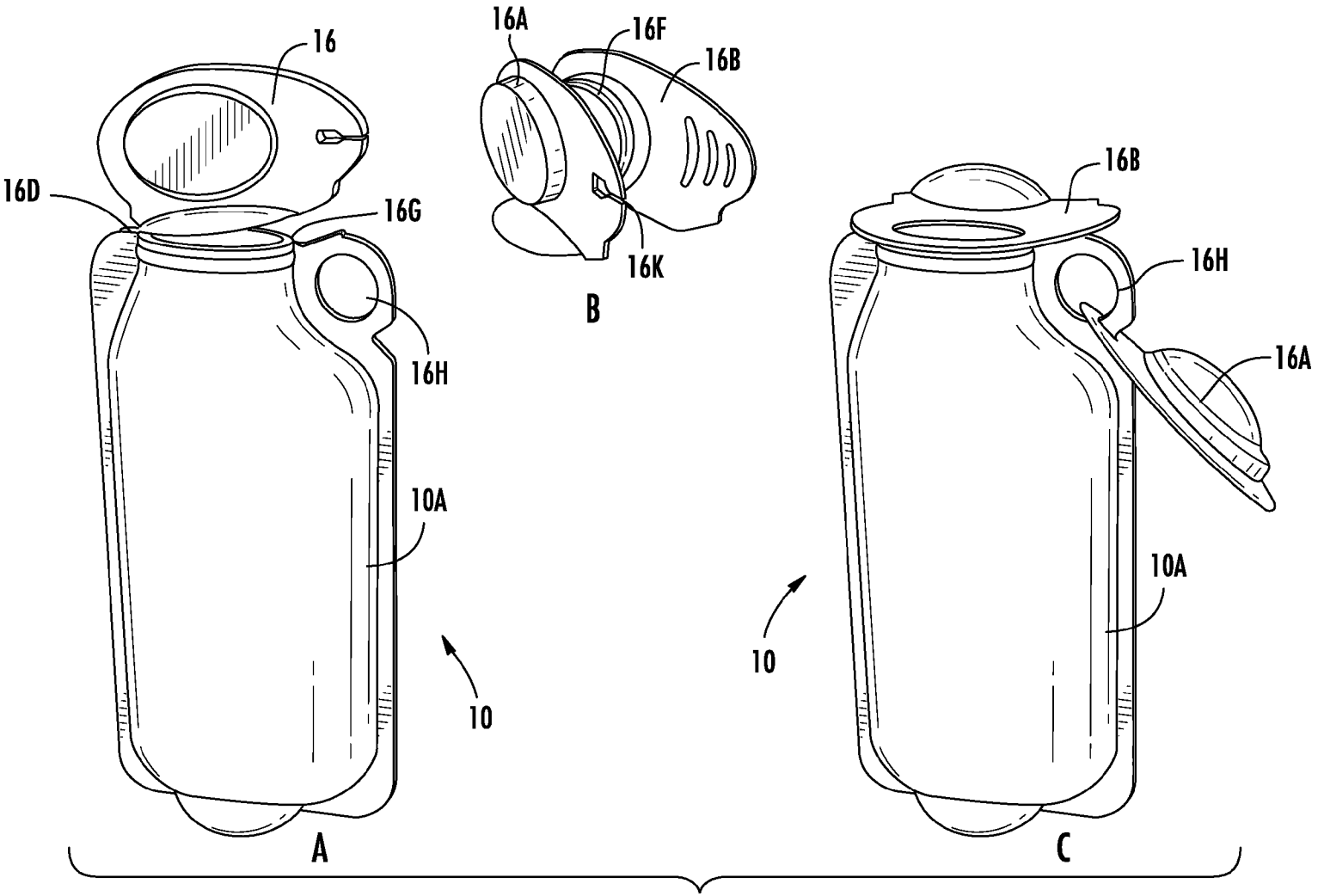
FIGS. 3A, B and C show perspective views of the first embodiment showing, respectively, how the sealing enclosure is removed, showing how the sealing enclosure is split into two portions and how part of the sealing enclosure can be used to reseal the container and the other part is tethered to the cap.

FIG. 3 shows how the sealing portion of the closure device 16 is removed from the sections 10A and 10B. As shown, sealing portion of the closure device 16 is removed by applying a force while holding the container. This allows the sealing portion of the closure device 16 to tear away from the sections 10A and 10B at the frangible connection 16D as shown in FIG. 3A and also rupture the barrier film 12, exposing the contents of the container. Thereafter, the two portions 16A and 16B can be separated from each other. The portion 16B can then be used by inserting the sanitary convex projection 16F (nested in portion 16A) into the opening 16G of the container as shown in FIG. 3C. The other portion 16A can be tethered through a perforated finger loop opening 16H to secure portion 16A to avoid litter. The portion 16B includes a sanitary convex projection 16F which plugs into the opening 16G of the container 10. A notched opening 16K is provided in the portion 16A to enable it to be secured via the perforated finger loop opening 16H to the perforated finger loop opening 16H.

FIGS. 4A and B show a six-pack embodiment of the container. The containers are connected together along [the threaded closure fitment 20] *side portions 21* which are suitably perforated to allow the containers to be separated from each other. Portions 22 are provided integral with the containers to hold them together in the six-pack. The portions 22 are made of the same materials as the containers and thus are ecologically sensitive and recyclable.

As described above, preferably when the unfilled containers are shipped from the manufacturers, the sections 10A and 10B are disposed such that the two halves nest as shown as in FIG. 4C either already assembled or separated and then assembled. When the container is filled, the inverted half pops open either in a manufacturing facility or by a consumer at a municipal water source or retail venue kiosk. Turning again to FIG. 1, the container is filled through a port 24 provided at the base of the container which is sealed, preferably with the same barrier film 12 when the container is filled.

Figure 5:
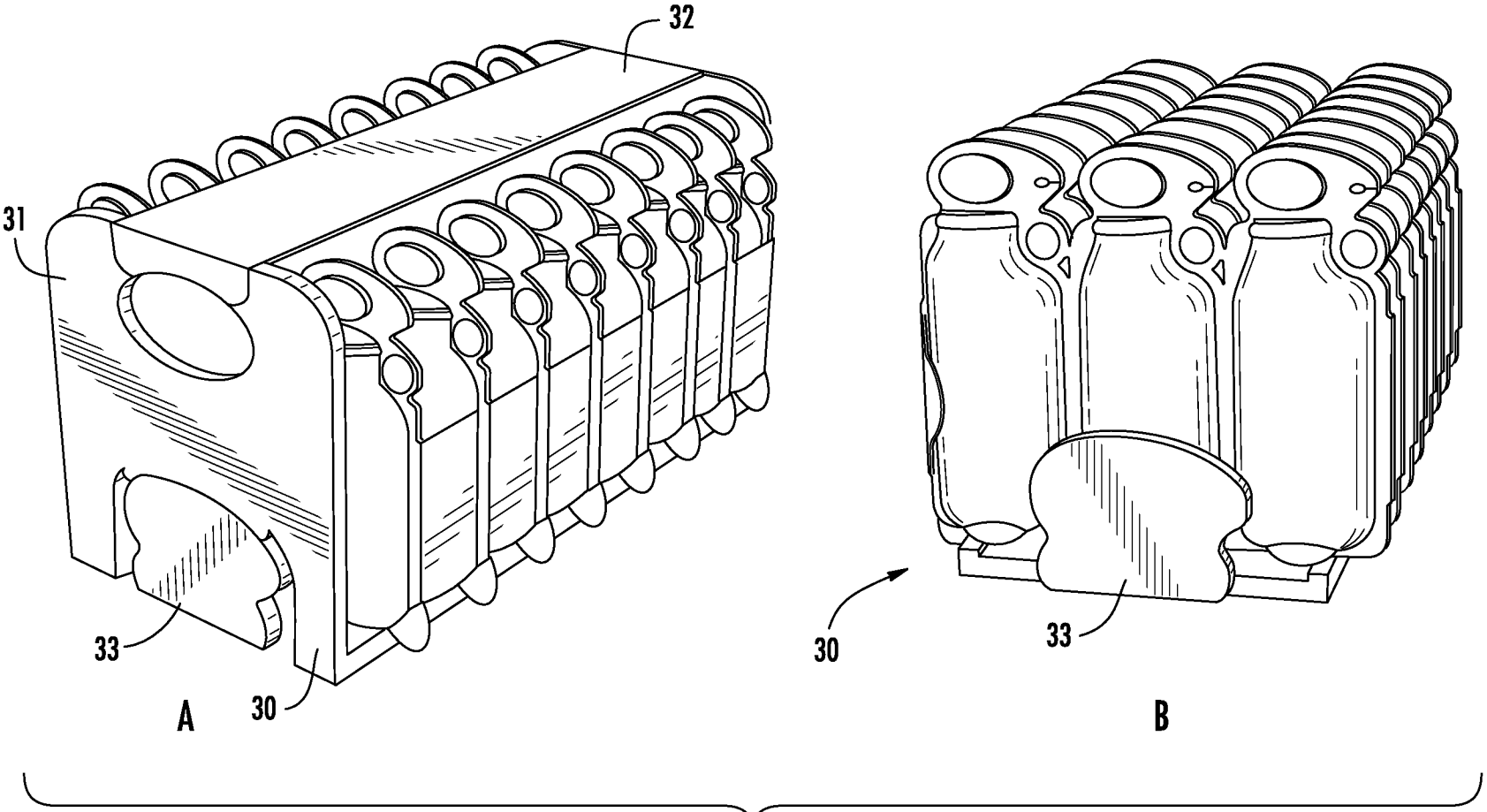
FIGS. 5A and B show how the six-packs can be shipped and merchandised via a shipper and merchandiser.

FIGS. 5A and B show a combined shipper and merchandiser for the six-pack containers. FIG. 5 shows four six-packs contained in the shipper and merchandiser 30. According to this embodiment, the shipper and merchandiser 30 includes support stanchion portion 31, top 32 and bottom portion 33. The portions 31 and 32 are removed from the bottom portion 33 when it is desired to display the containers at the point of sale, as shown in FIG. 5B.

Figure 6:
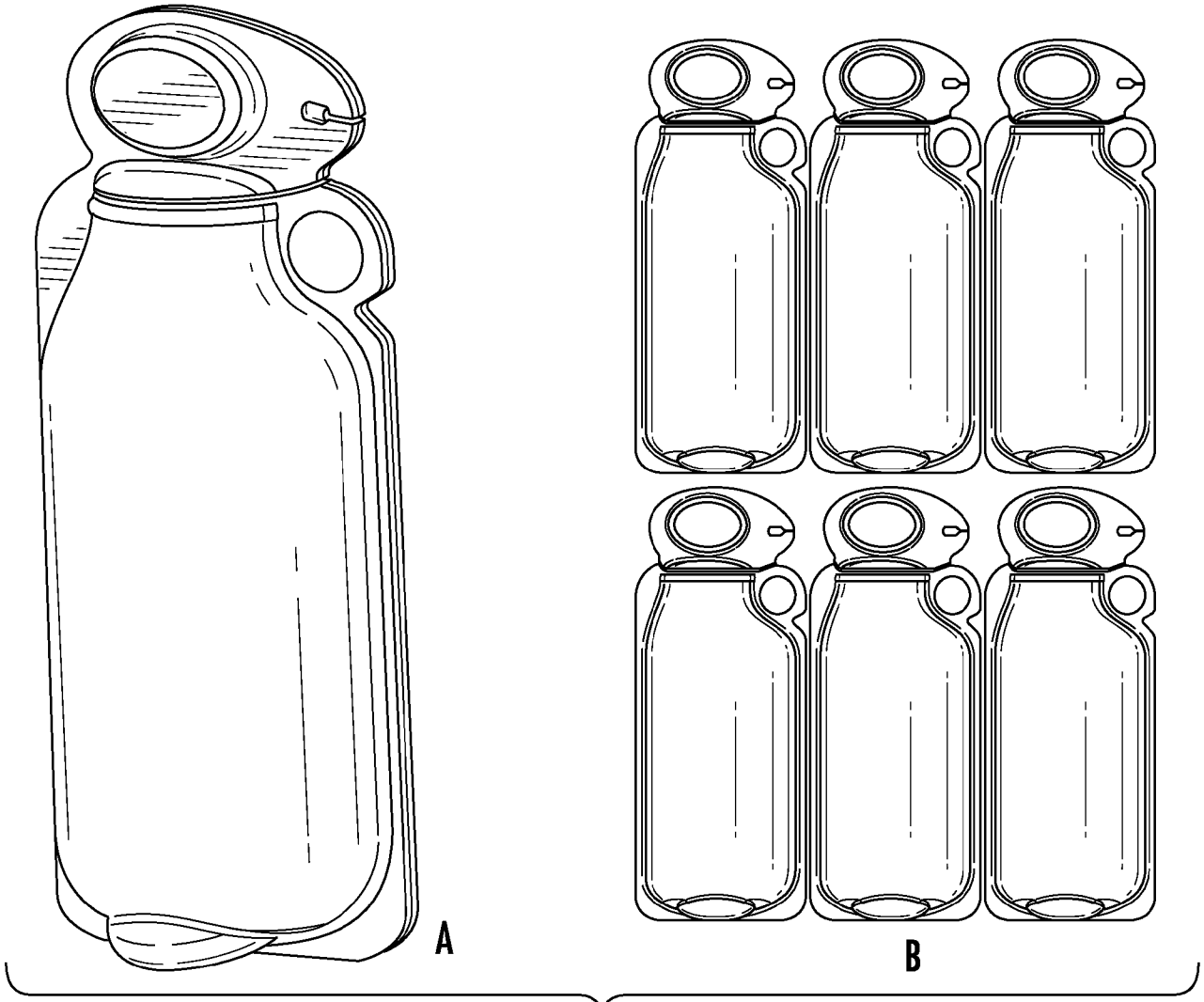
FIGS. 6A and B show the first embodiment of the container in a perspective view and plural ones of the container.

FIG. 6 shows the unopened container according to the first embodiment in a perspective (6A) and in plural front views (6B). The containers can take various colors, can be embossed as shown and/or labels can be applied. Preferably, the graphical brand communication coincides with the natural properties of the materials used, such as bamboo, for example, by embossing, direct printing of natural dies and inks or alternatively, with the application of applied labels. With respect to the shipper and merchandiser 30, as shown in FIG. 5, the shipper/merchandising components can be made of all natural structural board that reduces the material used in palletizing through the creation of vertical support stanchions such as support stanchion portion 31. The vertical stanchions, such as support stanchion portion 31 snap off to enable self-merchandising as shown in FIG. 5B.

As shown in the six-pack of FIG. 4, the design enables the self-bundling of multiple containers to negate the use of a separate six-pack carrier.

Figure 1:
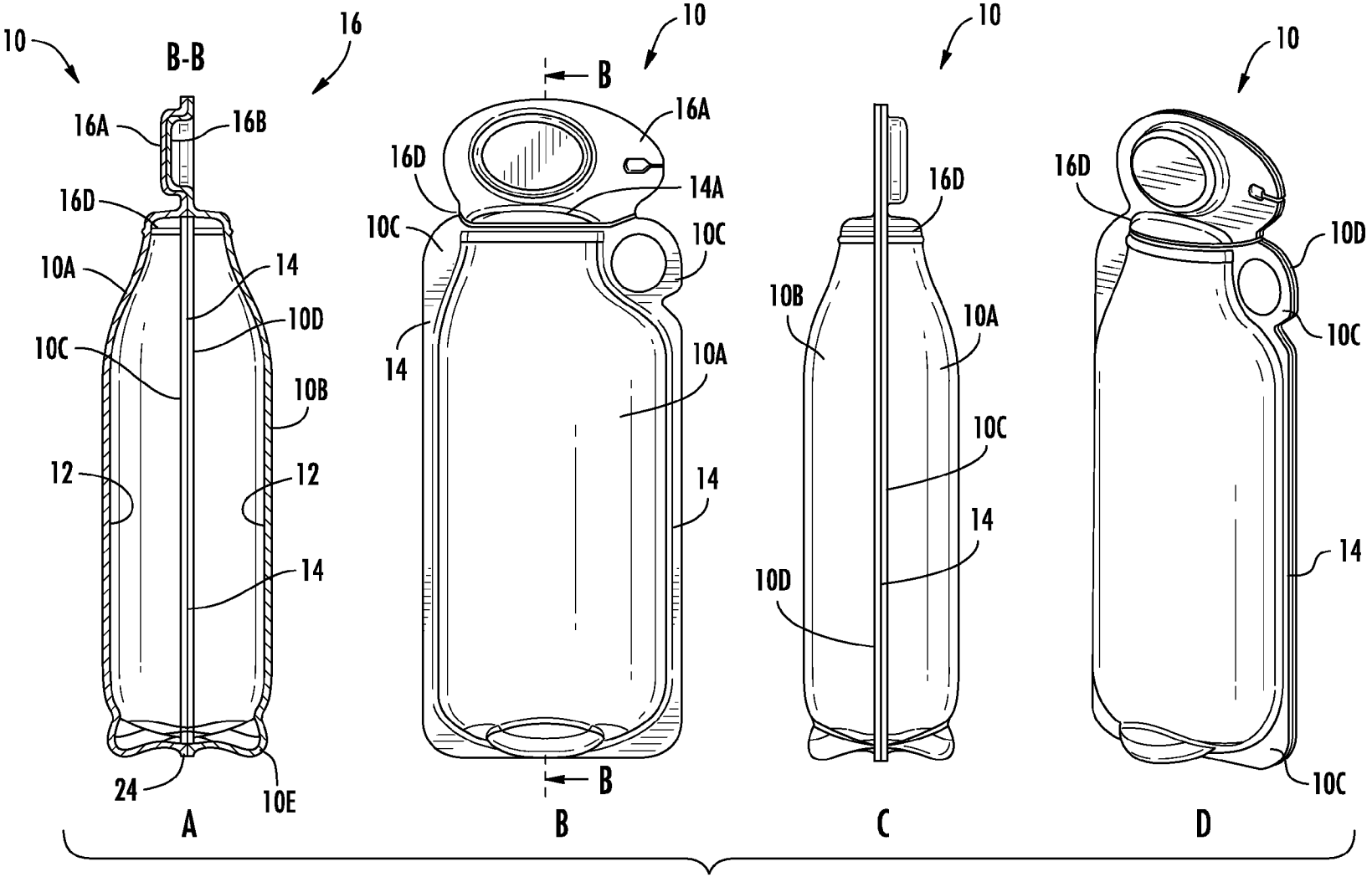
FIGS. 1A, B, C and D show a first embodiment and in particular.
FIG. 1B shows a front, partially phantom view.
FIG. 1C shows a left side view.
FIG. 1D shows a perspective view.

As described, the embodiment in FIG. 1 is filled through a bottom port and has a novel sealing portion of the closure device 16.

Figure 2:
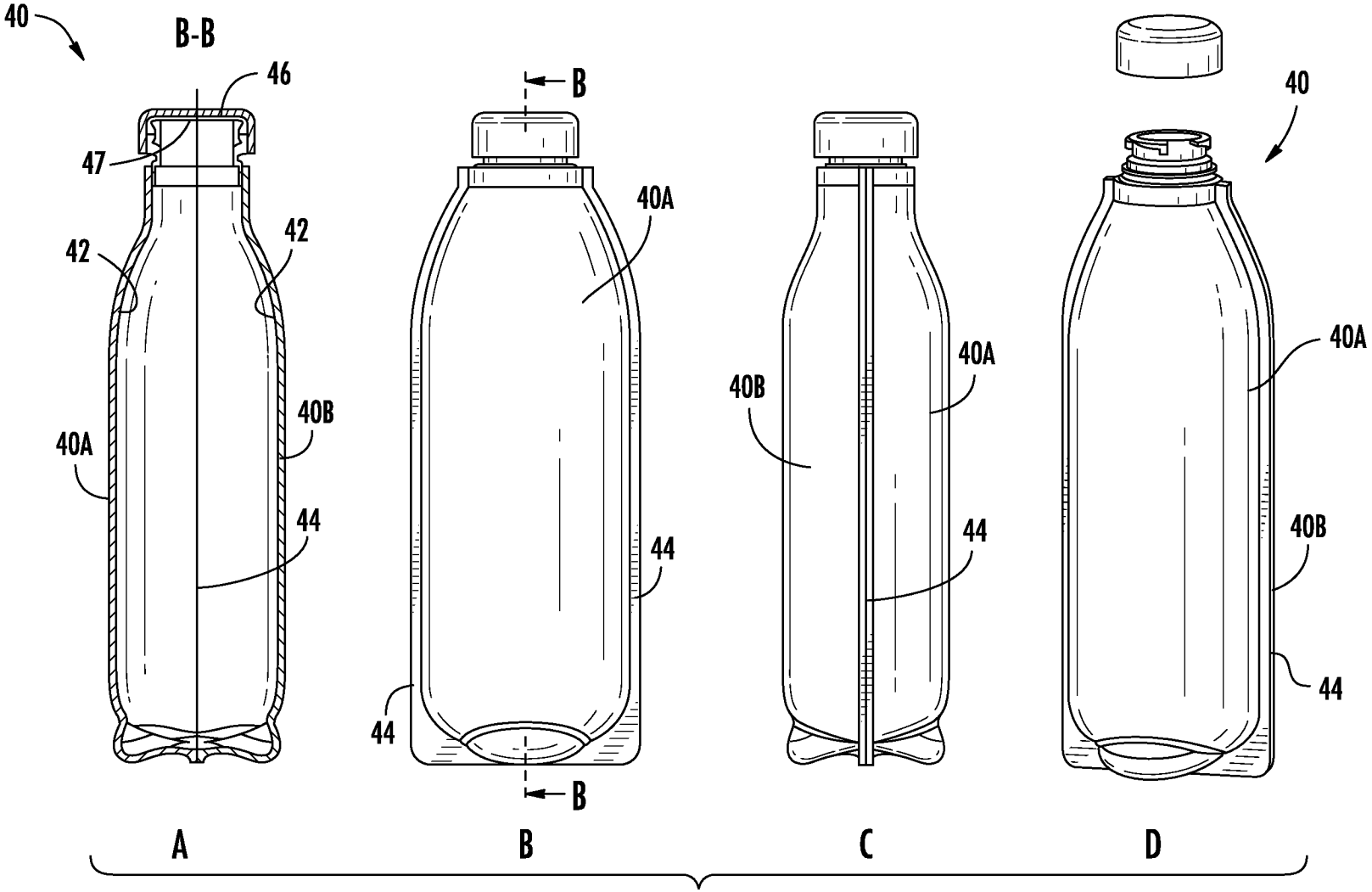

FIG. 2 shows an alternate container 40 similar to the first design in that it is made of halves 40A and 40B with a barrier film 42 that enables the two halves to be sealed along the joint line 44. However, the embodiment as shown in FIG. 2 employs a screw cap closure 46. A polymer liner 47 is employed to provide the requisite seal. Preferably, the screw cap closure 46 is made of an environmentally friendly material and preferably the same material as halves 40A and 40B.

It should be understood that, in some embodiments, the first biodegradable outer shell portion, the second biodegradable outer shell portion, and the barrier film piece each extend to and contact a thread forming component of a closure fitment of the closure device to define a rim portion of the environmentally friendly container. In some embodiments, a subset of these components may define this rim portion.

Figure 7C:
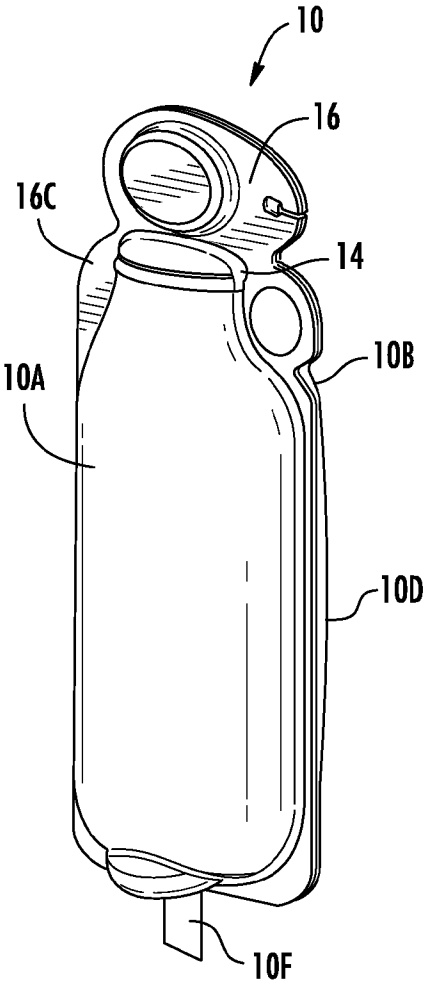
FIG. 7C shows a perspective view of the container.
Figure 7B:
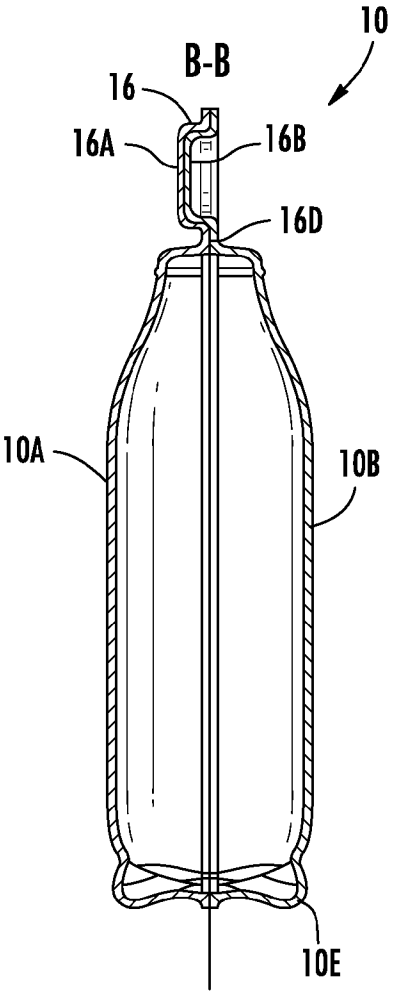
FIG. 7B shows a sectional view of the container along line B-B of FIG. 7A.
Figure 7A:
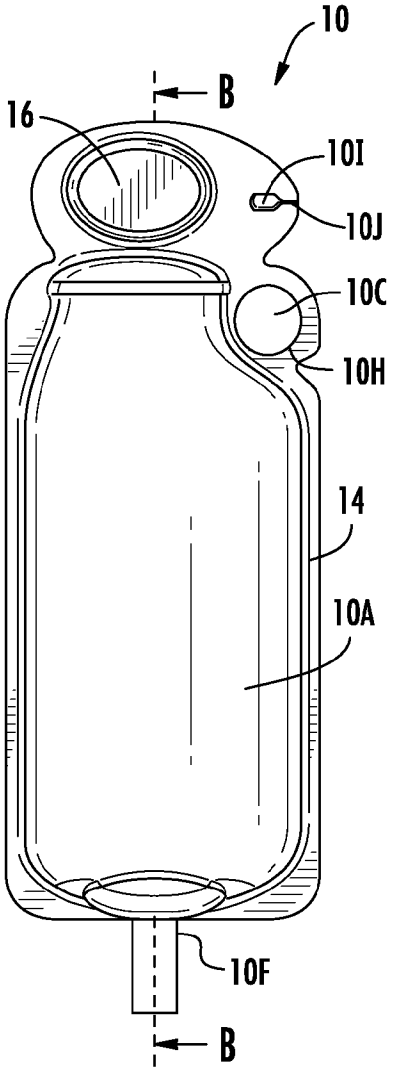
FIG. 7A shows a plan view of a variation of the first embodiment of the ecologically friendly container.
Figure 8A:
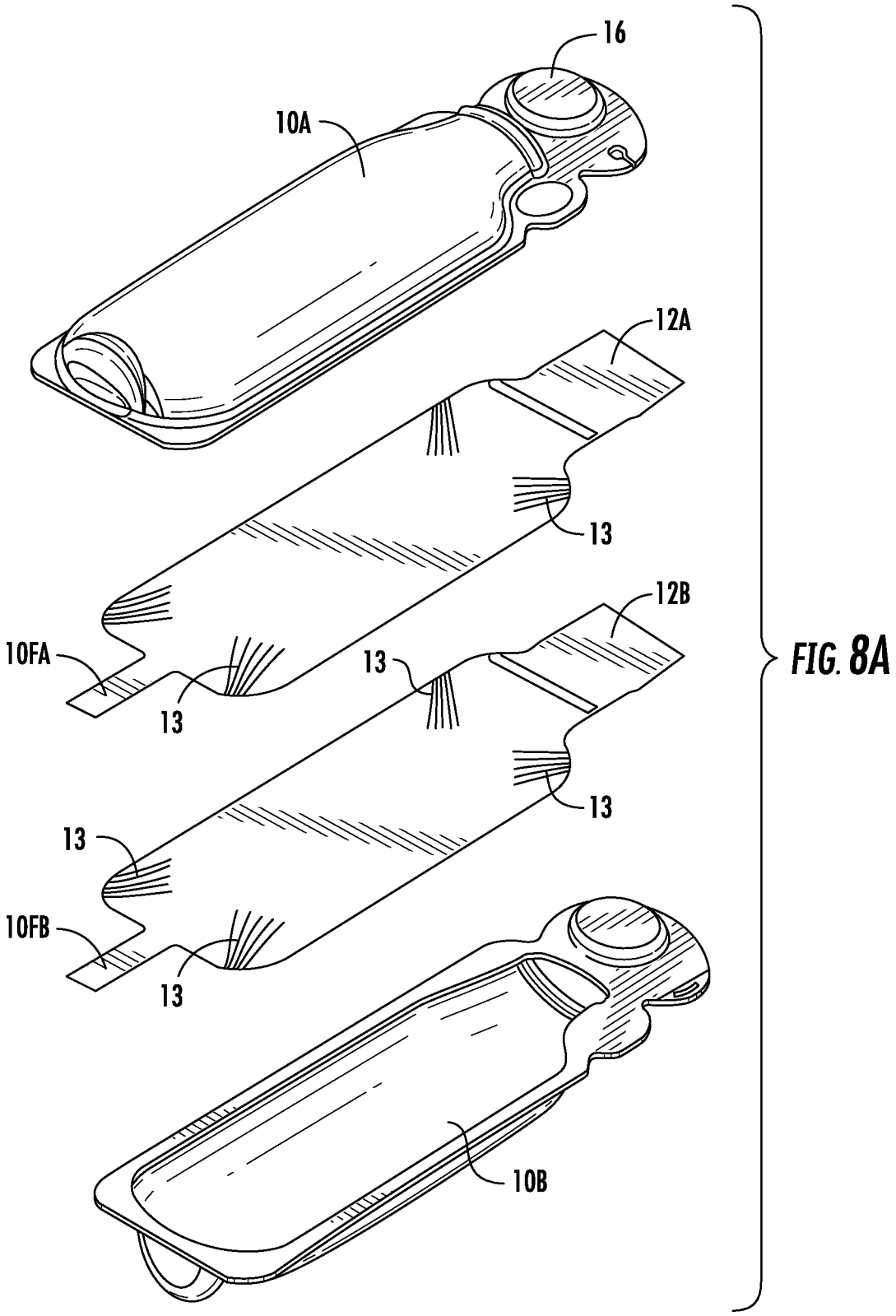
FIG. 8A shows the construction method for the container of FIG. 7.
Figure 8D:
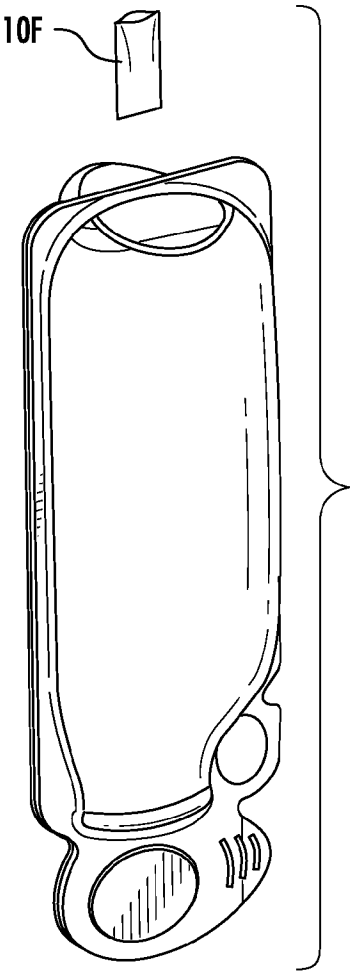
FIG. 8D shows the inverted container with the filling tube removed

Turning to FIGS. 7A, B and C, a variation of the first embodiment of the container is shown. The invention comprises a container 10 which is made of an ecologically sensitive material such as bamboo, palm leaf or another paper product or any other ecologically considerate material, such as those described above. The container comprises sections 10A and 10B (see FIG. 8A). The container halves are suitably pressed, stamped, molded or otherwise formed out of the material to form a container when joined together. With reference to FIGS. 8A, a pouch formed from the barrier film 12 comprising, in the embodiment shown in FIG. 8A, barrier film portions 12A and 12B are provided for providing a sealed pouch inside the sections 10A and 10B. The pouch formed from the barrier film 12 may be made of a micro-thin polymer/PLA/foil and/or laminate barrier sheet or another suitable environmentally friendly degradable plastic or other natural liquid barrier material.

During assembly, as shown in FIG. 8A, the barrier film portions 12A and 12B are disposed adjacent the respective sections 10A, 10B. According to one assembly method, the barrier film portions 12A and 12B may be adhered to the respective sections 10A and 10B by an electrostatic charge applied to the barrier film portion or the container portions, or both. Alternatively, an environmentally friendly adhesive can be used or a temporary attachment means can be used.

In order to allow the film to expand to the shape of the container halves, preferably folded in expansion bellows 13 are provided in the film.

Figure 8C:
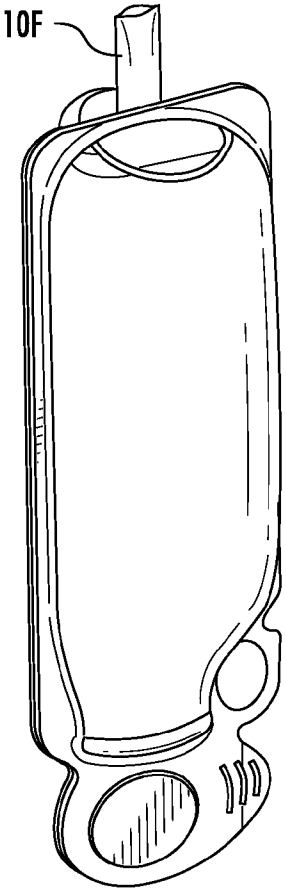
FIG. 8C shows the container in an inverted position showing the filling tube.
Figure 8B:
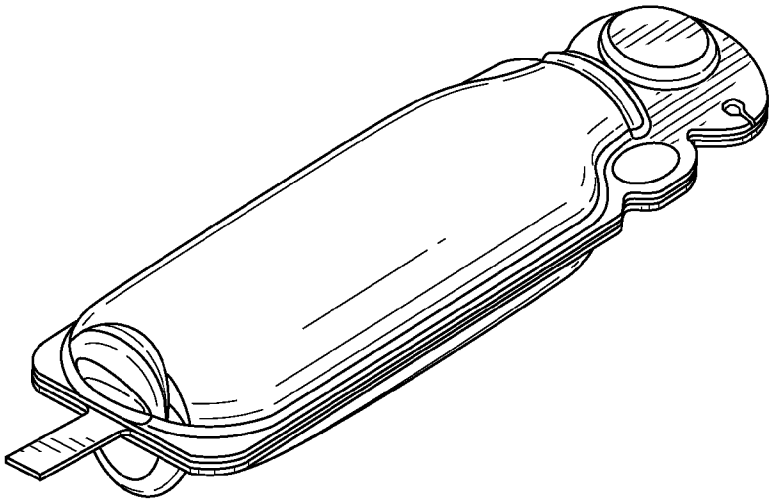
FIG. 8B shows a perspective view of the container of FIG. 8A after assembly.

Once the portions 10A, 12A, 12B and 10B are positioned as shown and clamped together, a suitable sealing/joining method, for example, RF Welding, induction welding, hot sealing or an adhesive is used to seal the barrier film portions 12A and 12B to each other and to their respective sections 10A and 10B, thereby forming a sealed container as shown in FIG. 8B. The container sections have flat side surfaces, such as flanges 10C and 10D where the sealing/joining is performed.

The two container halves and barrier sealed portions are bonded together along a joint line shown at 14 in FIG. 7A. In a preferable bonding method, the sealing of the barrier film halves to each other also joins the barrier films to the container halves.

A closure device 16 is formed from the two portions of the sections 10A and 10B which interlock together at the top of the container. The sealing portion of the closure device 16 comprises two portions 16A and 16B which interlock as shown. These two portions 16A and 16B are not required to be fused together. Each container half 10A and 10B includes the lateral side surfaces, such as flanges 10C and 10D which are sealed to each other along the joint 14 by the barrier film 12. Other techniques for sealing/joining include inductive heating, radio frequency welding, other heat joining techniques or the use of ecologically sensitive adhesives.

The closure device 16 is integrally formed with the sections 10A and 10B and includes a frangible connection 16D. The frangible connection allows the sealing portion of the closure device 16 to be removed by tearing from the sections 10A and 10B.

The container 10 includes a base portion 10E that allows the container to stand upright.

The container also includes a sealing tube 10F. The sealing tube is comprised of respective portions 10FA and 10FB of the barrier film portions 12A and 12B that are sealed to each other. The container is filled via the fill tube, such as sealing tube 1OF as shown in FIG. 8C. After the container is filled with the liquid, the sealing tube 1OF is removed and the barrier film portions at the cut off fill tube are sealed by any suitable technique including the techniques described above.

In use, the closure device 16 is removed from the sections 10A and 10B by tearing, allowing the contents to be dispensed. The convex shape of the closure device 16 can be employed to reseal the container. The shape of the convex portion is designed to snap into the opened container to allow its temporary sealing. Once the contents have been consumed, the closure device 16 can be inserted into the opening 10G across the ear 10H attaching it via the opening 101 having a slot 10J so that the container with its closure can be disposed of as a unit.

Figure 9C:
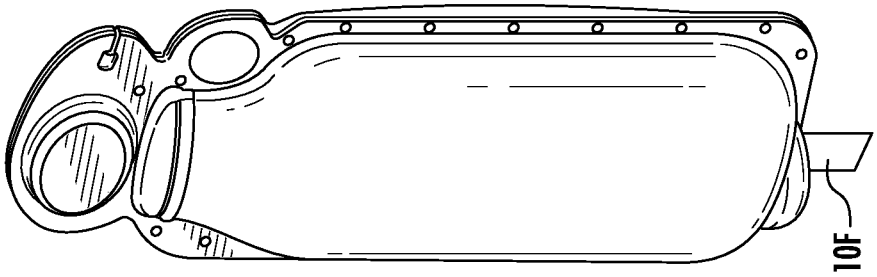
FIG. 9C is a perspective view of the container of FIG. 9A.
Figure 9B:
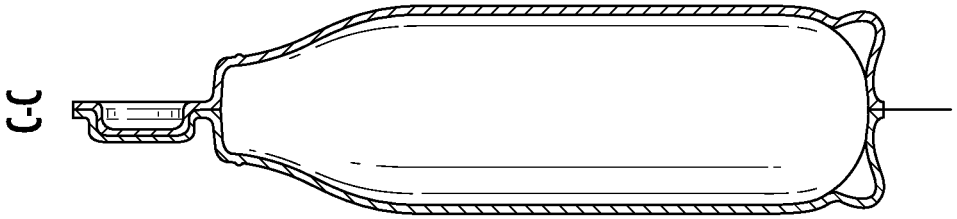
FIG. 9B shows a sectional view of the container of FIG. 9A

FIGS. 9 and 10 show yet a further embodiment. In this embodiment, which is similar, the pouch may be pre-sealed, as shown in FIG. 10A. The two halves of the pouch can be pre-sealed by any suitable means including the means discussed with respect to the first embodiment. Folded in expansion bellows 13 may be formed in the pouch to allow for expansion when the fluid is dispensed into the pouch and to allow the pouch to assume the interior shape of the container.

Figure 9A:
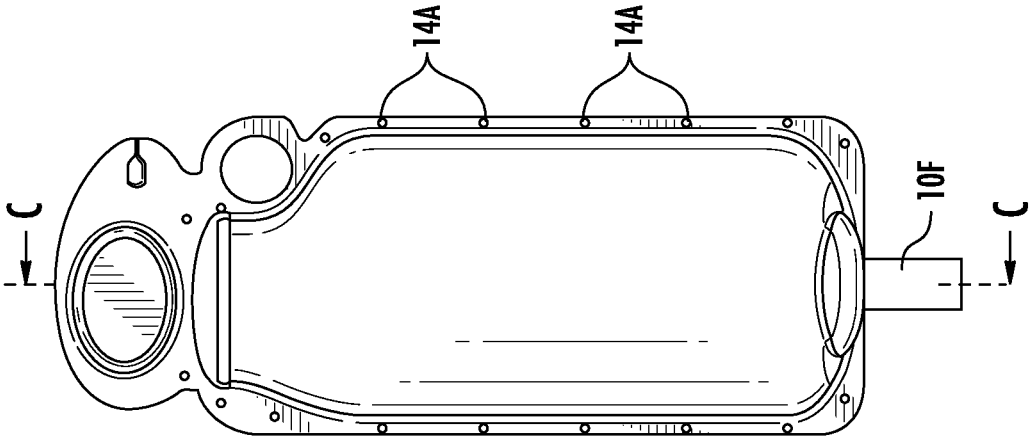
FIG. 9A shows a further embodiment of the container.
Figure 10A:
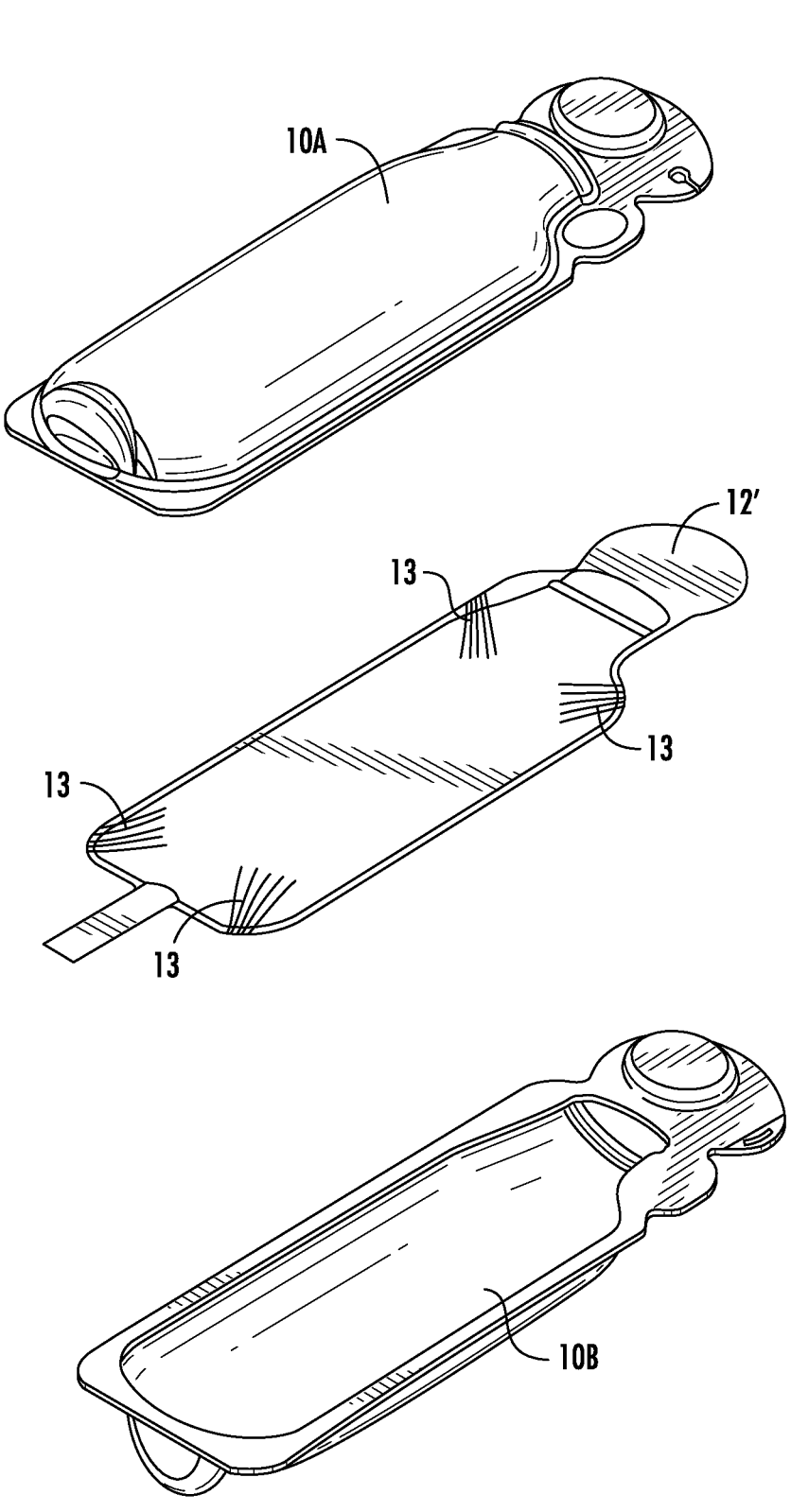
FIG. 10A shows the construction method for the container of FIG. 9.
Figure 10D:
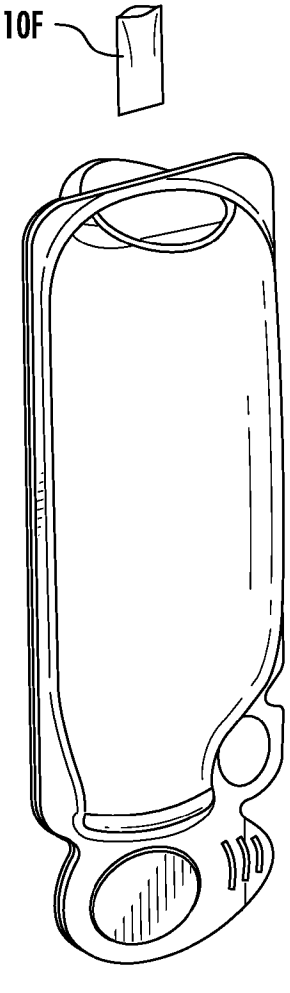
FIG. 10D shows the inverted container after the filling tube has been attached and the container sealed.
Figure 10C:
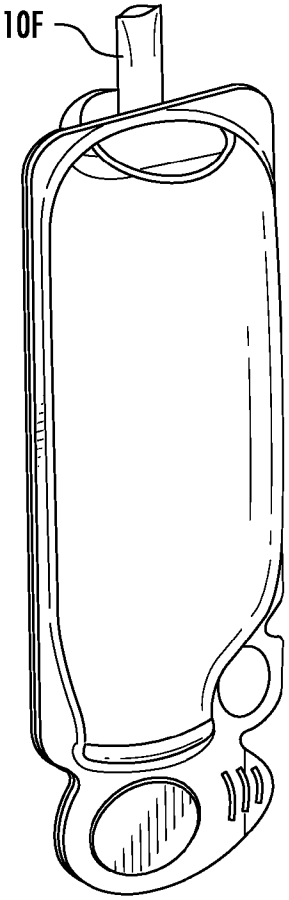
FIG. 10C shows the inverted container of FIG. 10B with the filling.
Figure 10B:
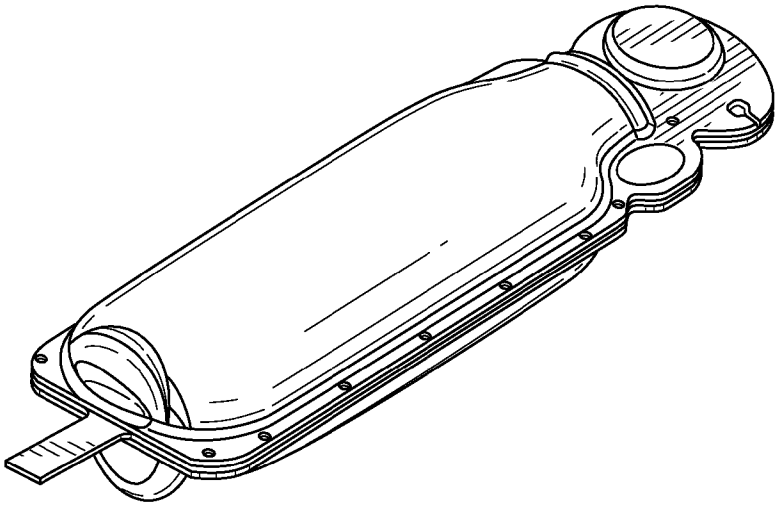
FIG. 10B shows the container of FIG. 10A in a perspective view.
Figure 11A:
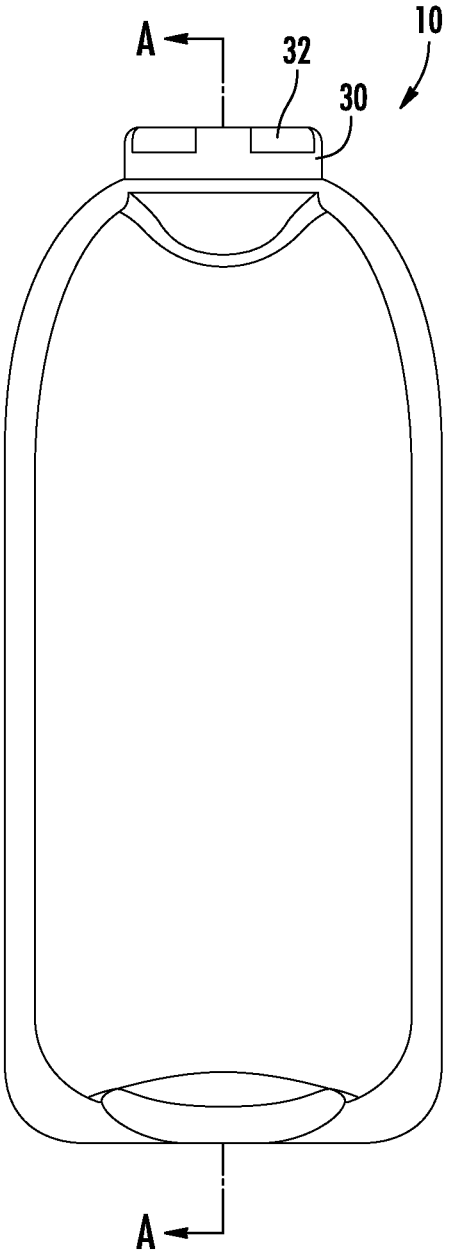
FIG. 11A shows a further embodiment of the container of the invention with a screw cap.
Figure 11B:
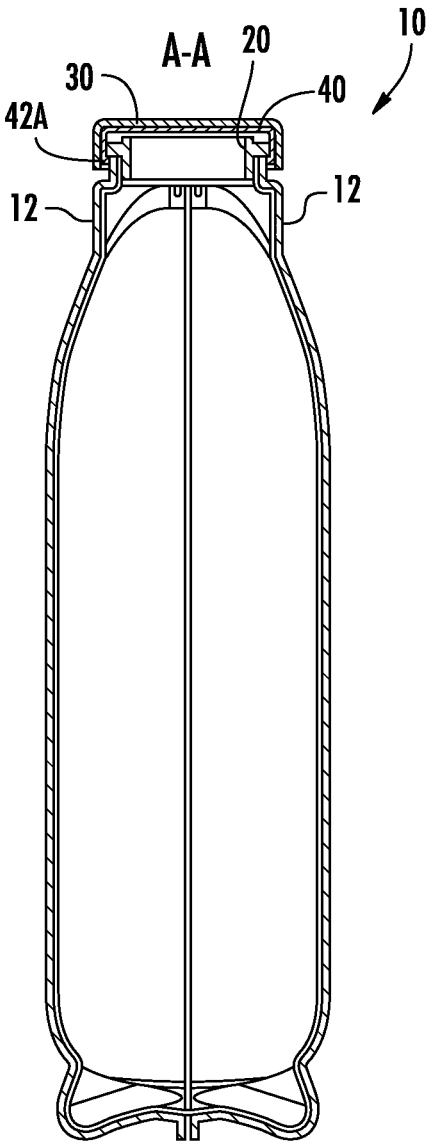
FIG. 11B shows the container of FIG. 11A in a sectional view along lines A-A of FIG. 11A.
Figure 11D:
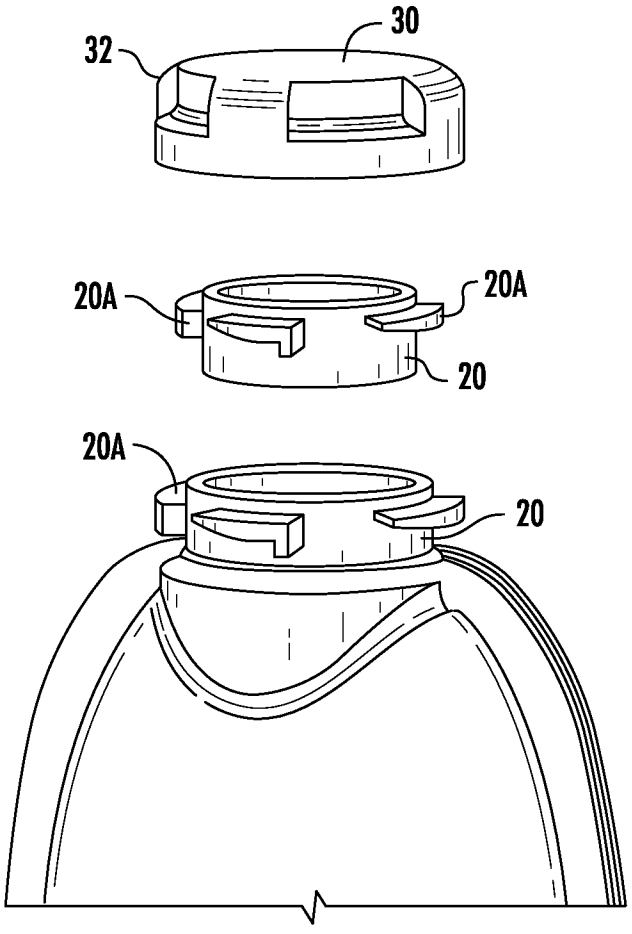
FIG. 11D is an exploded view showing the top of the container showing the sealed in threaded closure fitment and the cap.
Figure 11C:
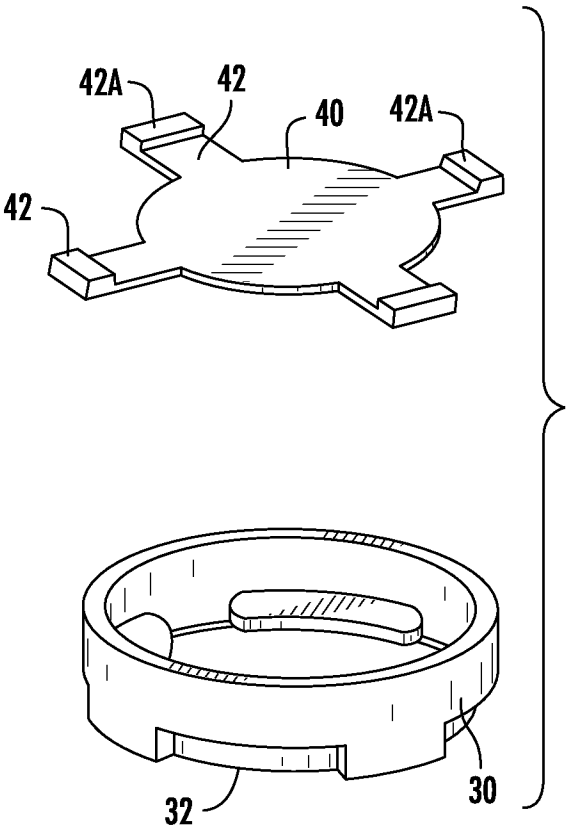
FIG. 11C shows the cap for the container together with the liner which is inserted into the cap.
Figure 11E:
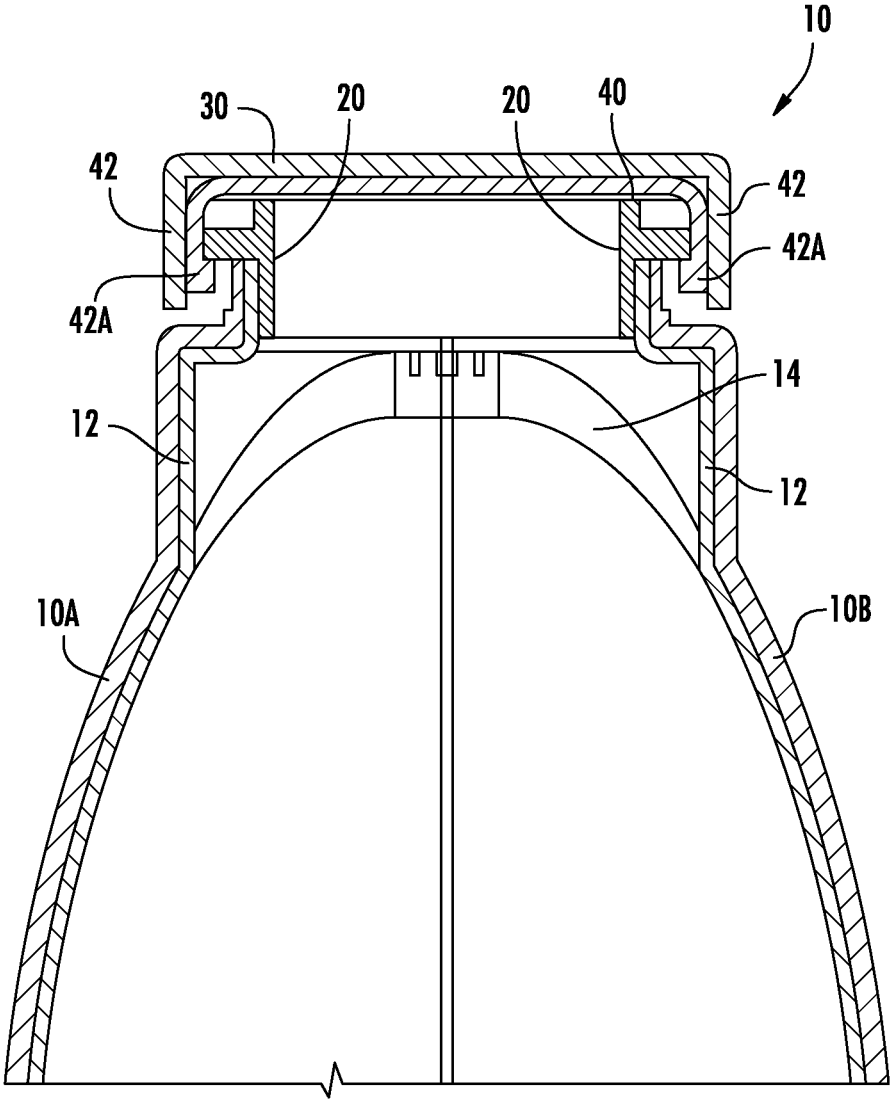
FIG. 11E is a detailed view of the screw cap on the container.

In contrast to the embodiment of FIGS. 7 and 8, since the pouch is pre-sealed during or before the assembly process, the pouch need only be intermittently glued or adhered to the sections 10A or 10B, as shown by sealing areas on the joint 14A in FIG. 9A. Alternatively, a continuous seal like the seal of the joint 14 of FIG. 7 can be employed. The container is filled and sealed similarly to the container of FIG. 8 as shown in FIGS. 10C and 10D.

FIG. 11 shows an alternative embodiment of the invention which is applicable to either of the assembly methods shown in FIG. 8 or FIG. 10. The embodiment of FIG. 11 employs a more conventional screw-type cap made of unconventional materials, however. The container 10, which is formed in ways similar to the containers of FIGS. 7 to 10, employs a sealed and threaded closure fitment 20 shown in FIG. 11D. This threaded closure fitment 20 is sealed to a screw thread of the barrier film 12 to provide a seal. The threaded closure fitment 20 includes thread components 20A formed along its perimeter. The threaded closure fitment 20 can be made of a polymeric material or alternatively, any other suitable material, preferably a bio-degradable material. A cap 300 preferably formed of paper or other environmentally friendly material includes a plurality of indents 32, preferably four, which are provided to trap a liner 400 (see FIG. 11C), which is formed as a spider element with thread-forming components 420. The liner 400 may be made of a sealing polymer and preferably of an environmentally friendly material. The liner 400 is pressed into the cap 300, such that the thread-forming components 420 are bent substantially at a right angle and captured between the indents 32 to trap the liner in place. The thread-forming components 420 each have a respective projection 42A which form the mating screw components to engage the thread components 20A of the threaded closure fitment 20. This is shown in FIG. 11B and in the detail of FIG. 11E.

Figure 12:
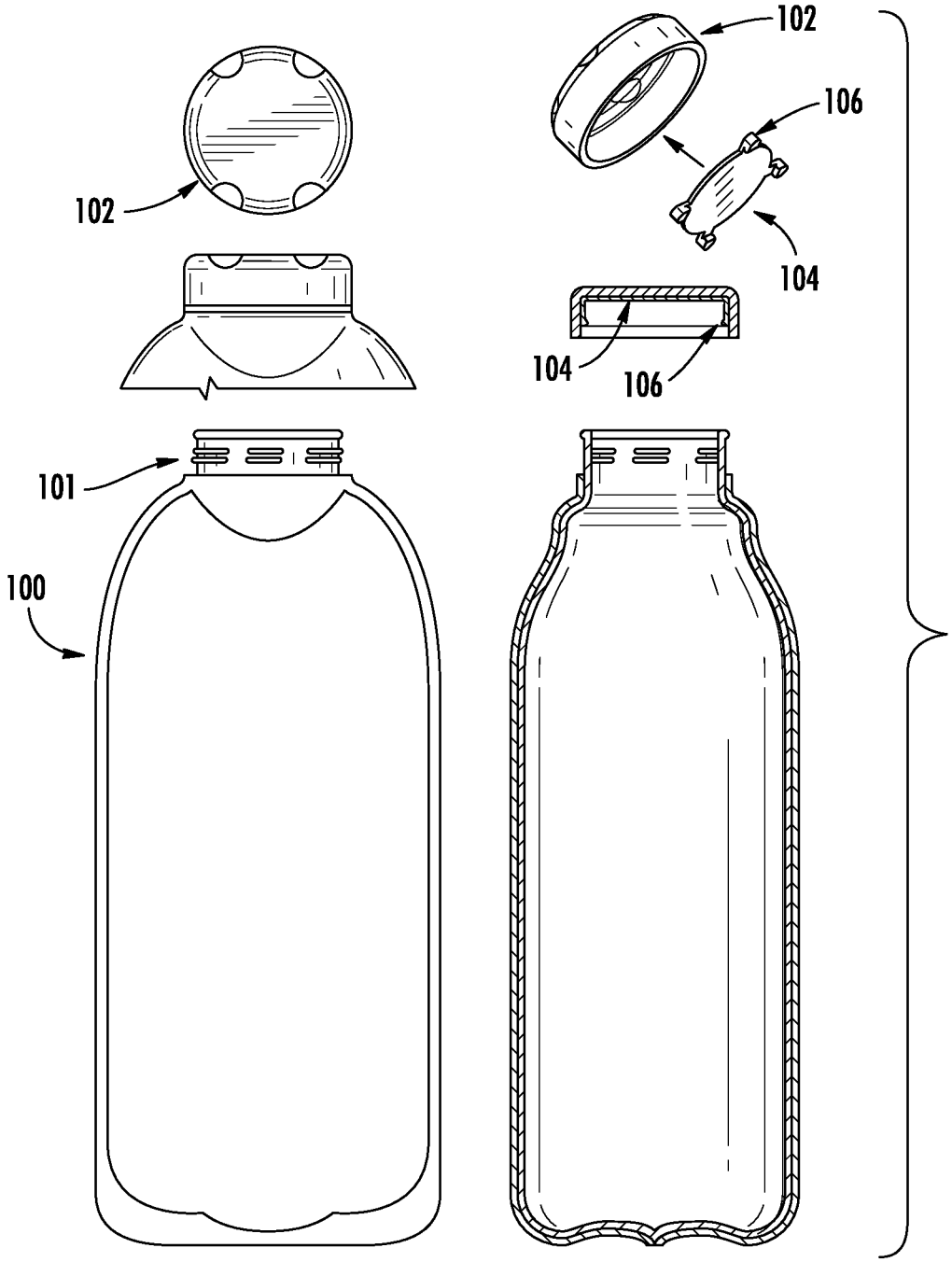
FIG. 12 is a detailed view of a closure device for an environmentally friendly container.

FIG. 12 is a detailed view of a closure device 102 for an environmentally friendly container 100. As illustrated, the environmentally friendly container 100 may include an opening 101 that includes a threaded exterior for receiving a closure device 102. The closure device 102 may be any type of closure device that is capable of pairing with the opening 101 to maintain a volume of liquid within the environmentally friendly container 100. As discussed above, the closure device 102 may be configured as a screw cap or other device. In FIG. 12, the closure device 102 is also coupled with a sealing film 104 that is placed within an interior portion of the closure device 102 to provide a liquid tight seal with the opening 101 of the environmentally friendly container 100. The sealing film 104 may include one or more threads 106 that further provide matching threads to removably attach with the opening 101 of the environmentally friendly container 100. The threads 106 may be shaped as illustrated in FIG. 12 and/or may take other configurations, depending on the size and shape of the closure device 102 and the threads of the opening 101. As illustrated in FIG. 12 however, is that the threads 106 are configured to engage with the treads of the opening 101 for providing the liquid tight seal between the sealing film 104 and the opening 101 of the environmentally friendly container 100.

Figure 13:
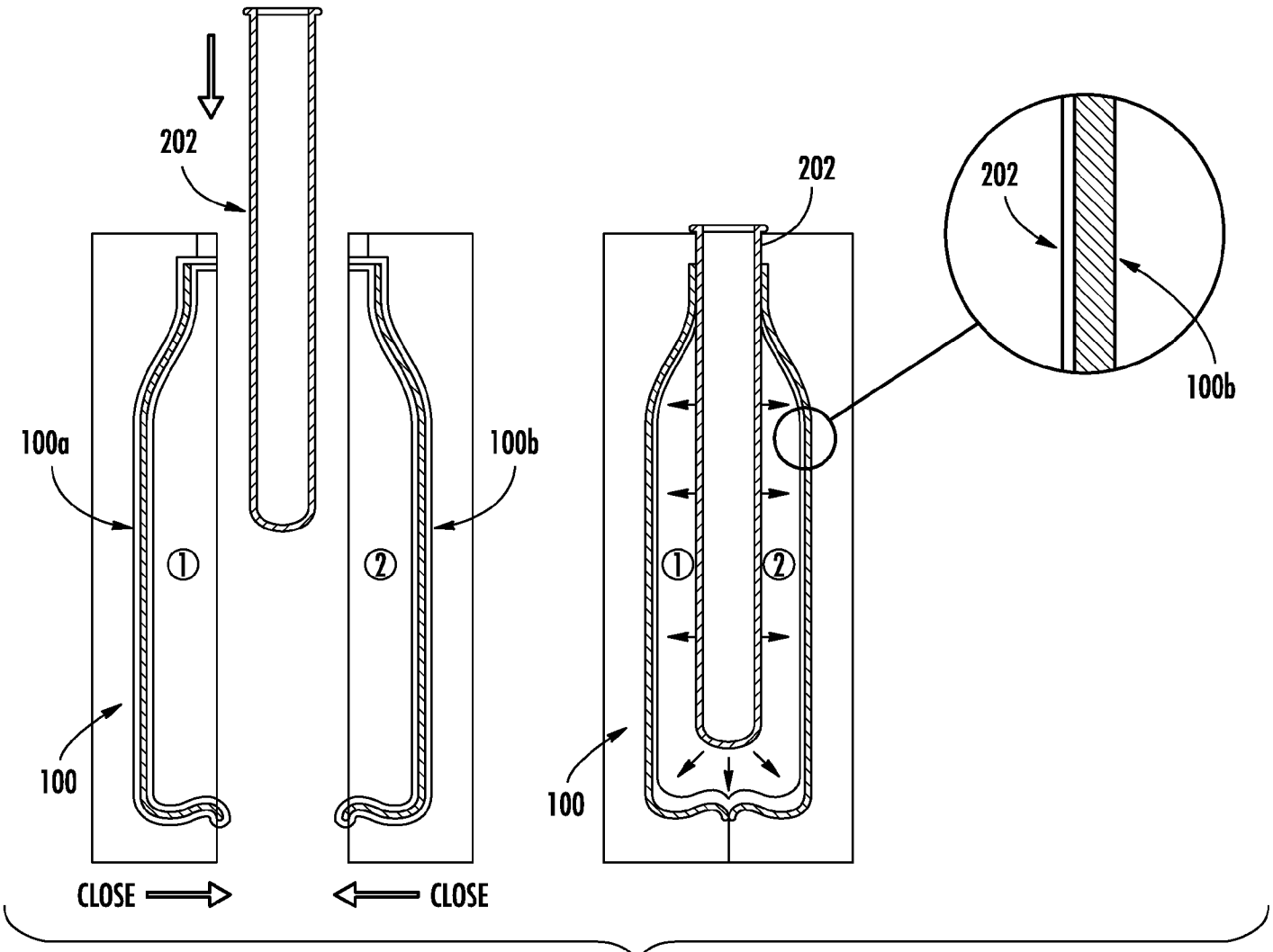
FIG. 13 is a detailed view of a blow molded barrier film piece for an environmentally friendly container.

FIG. 13 is a detailed view of a blow molded barrier film piece for an environmentally friendly container 100. As illustrated, the environmentally friendly container 100 may be constructed of a first environmentally friendly outer shell portion 100a, and a second environmentally friendly outer shell portion 100b. The two environmentally friendly outer shell portions 100a, 100b may be put together around a single barrier film piece, depicted in FIG. 13 as a preform 202 that may take the shape of a cylinder or other similar shape. The preform may be constructed of a super light-weight material and may be inserted between the two environmentally friendly outer shell portions 100a, 100b (before or after the two environmentally friendly outer shell portions 100a, 100b have been sealed together). In the depiction of FIG. 13, the two environmentally friendly outer shell portions 100a, 100b may be inserted into a housing tool as the housing tool closes, the preform 202 is inserted. As the housing tool closes, the preform 202 is heated and stretch to a concave inner portion or interior surface of the two environmentally friendly outer shell portions 100a, 100b. Air is forced into the preform 202, thereby expanding the preform to the interior surface of the two environmentally friendly outer shell portions 100a, 100b. The closing of the two environmentally friendly outer shell portions 100a, 100b activates on the edges to seal the two environmentally friendly outer shell portions 100a, 100b together.

It should also be understood that in some embodiments, the two environmentally friendly outer shell portions (in any of the embodiments) and the barrier film piece may be constructed as very thin materials. Accordingly, some of these embodiments may be so thin (or have other dimensions) as to not be able to maintain a desired or predetermined shape of the environmentally friendly container 100 and/or withstand outward forces from the liquid contents of the environmentally friendly container. As such, some embodiments of this disclosure may be configured with a corset on a portion of the environmentally container. The corset may be an additional material and/or layer that wraps around the perimeter of the barrier film piece and/or the two environmentally friendly outer shell portions to provide the desired structural stability and/or prevent leakages or other malfunctions with the container. In some embodiments, the corset may configured as a material that extends longitudinally (from top to bottom) of the environmentally friendly container 100 instead of circumferentially. Regardless, these embodiments allow for super thin materials to be used in the construction of the environmentally friendly bottle, while still provide desired shape or desired structure characteristic.

Additionally, some embodiments may be configured with a window on the first environmentally friendly outer shell portion and/or the second environmentally friendly outer shell portion. In such embodiments, the window may provide a view to contents being stored within the environmentally friendly container. The window may be translucent and/or partially translucent to provide this desired function.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. An environmentally friendly container for liquids comprising:

a first environmentally friendly outer shell portion and a second environmentally friendly outer shell portion, wherein the first environmentally friendly outer shell portion and the second environmentally friendly outer shell portion form an outer layer of the environmentally friendly container, wherein the first environmentally friendly outer shell portion and the second environmentally friendly outer shell portion are constructed of an environmentally friendly material;

a barrier film piece that is disposed on a concave inner portion of the first environmentally friendly outer shell portion and the second environmentally friendly outer shell portion to define a liquid reservoir; and a closure device formed from the first environmentally friendly outer shell portion, the second environmentally friendly outer shell portion, and the barrier film piece, wherein the closure device is configured for reattachment to the environmentally friendly container to prevent loss of a liquid from the liquid reservoir, wherein the first environmentally friendly outer shell portion, the second environmentally friendly outer shell portion, and the barrier film piece each extend to and contact a thread forming component of a closure fitment of the closure device of the environmentally friendly container to define a rim portion of the environmentally friendly container, wherein the closure device comprises a screw cap, wherein the screw cap is constructed of the environmentally friendly material that includes a sealing liner for sealing to the closure fitment provided on the first environmentally friendly outer shell portion and the second environmentally friendly outer shell portion.

2. The environmentally friendly container of claim 1, wherein the barrier film piece comprises at least one of the following: a polymer film, a polymer foil laminate, and a liquid barrier material.

3. The environmentally friendly container of claim 1, wherein the first environmentally friendly outer shell portion and the second environmentally friendly outer shell portion are constructed of at least one of the following: agricultural processing materials, post-consumer waste, and composite materials.

4. The environmentally friendly container of claim 1, wherein the sealing liner comprises thread portions to engage the closure fitment.

5. The environmentally friendly container of claim 1, wherein the sealing liner bends at a right angle vertically along a side of the screw cap so that thread portions of the screw cap engage the closure fitment.

6. The environmentally friendly container of claim 1, further comprising a corset for strengthening a structural characteristic of the environmentally friendly container, wherein the first environmentally friendly outer shell portion, the second environmentally friendly outer shell portion, and the barrier film piece are constructed with dimensions such that without the corset, a desired shape of the environmentally friendly container could not be maintained.

7. The environmentally friendly container of claim 1, further comprising a window on at least one of the following: the first environmentally friendly outer shell portion and the second environmentally friendly outer shell portion, wherein the window provides a view to contents being stored within the environmentally friendly container.

8. An environmentally friendly container for liquids comprising:

a first biodegradable outer shell portion and a second biodegradable outer shell portion, wherein the first biodegradable outer shell portion and the second biodegradable outer shell portion form an outer layer of the environmentally friendly container;

a barrier film piece disposed on a concave inner portion of the first biodegradable outer shell portion and the second biodegradable outer shell portion respectively, wherein the barrier film piece is constructed of a pre-sealed liquid container and defines a liquid reservoir; and a closure device formed from the first biodegradable outer shell portion, the second biodegradable outer shell portion, and the barrier film piece, wherein the closure device is configured for reattachment to the environmentally friendly container to prevent loss of a liquid from the liquid reservoir, wherein the first biodegradable outer shell portion, the second biodegradable outer shell portion, and the barrier film piece each extend to and contact a thread forming component of a closure fitment of the closure device to define a rim portion of the environmentally friendly container, wherein the closure device comprises a screw cap, wherein the screw cap is constructed of a biodegradable material that includes a sealing liner for sealing to the closure fitment provided on the first biodegradable outer shell portion and the second biodegradable outer shell portion.

9. The environmentally friendly container of claim 8, wherein the barrier film piece comprises at least one of the following: a polymer film, a polymer foil laminate, and a liquid barrier material, and wherein the first biodegradable outer shell portion and the second biodegradable outer shell portion are constructed of at least one of the following: agricultural processing materials, post-consumer waste, and composite materials.

10. The environmentally friendly container of claim 8, wherein the screw cap comprises a plurality of indents to hold the sealing liner in place.

11. The environmentally friendly container of claim 8, wherein the sealing liner comprises thread portions to engage threads on the closure fitment.

12. The environmentally friendly container of claim 11, wherein the sealing liner bends at a substantially right angle vertically along the side of the screw cap so that the thread portions engage the closure fitment.

13. The environmentally friendly container of claim 8, wherein the barrier film piece is blow molded to an interior portion of the outer layer.

14. The environmentally friendly container of claim 8, further comprising a corset for strengthening a structural characteristic of the environmentally friendly container, wherein the first biodegradable outer shell portion, the second biodegradable outer shell portion, and the barrier film piece are constructed with dimensions such that without the corset, a desired shape of the environmentally friendly container could not be maintained.

15. An environmentally friendly container for liquids comprising:

a first environmentally friendly outer shell portion and a second environmentally friendly outer shell portion, wherein the first environmentally friendly outer shell portion and the second environmentally friendly outer shell portion form an outer layer of the environmentally friendly container, wherein the first environmentally friendly outer shell portion and the second environmentally friendly outer shell portion are constructed of an environmentally friendly material;

a barrier film piece that is disposed on a concave inner portion of the first environmentally friendly outer shell portion and the second environmentally friendly outer shell portion respectively, wherein the barrier film piece creates a liquid reservoir for holding a liquid, wherein the barrier film piece [create] *creates* a sealing tube for receiving the liquid; and a closure device formed from the first environmentally friendly outer shell portion, the second environmentally friendly outer shell portion, and the barrier film piece, wherein the closure device is configured for reattachment to the environmentally friendly container to prevent loss of the liquid from the liquid reservoir, wherein the first environmentally friendly outer shell portion and the second environmentally friendly outer shell portion each extend and contact a thread forming component of a closure fitment of the closure device of the environmentally friendly container to define a rim portion of the environmentally friendly container when the closure device is attached to the environmentally friendly container, wherein the closure device comprises a screw cap, wherein the screw cap is constructed of the environmentally friendly material.

16. The environmentally friendly container of claim 15, wherein the first environmentally friendly outer shell portion and the second environmentally friendly outer shell portion are fused together by at least one of the following: heating, radio frequency heating, inductive heating, pressure sealing, bonding, and adhering.

17. The environmentally friendly container of claim 15, wherein the barrier film piece is blow molded to an interior portion of the outer layer, wherein the environmentally friendly container comprises an opening having a screw thread for receiving the screw cap.

18. The environmentally friendly container of claim 15, further comprising a window on at least one of the following: the first environmentally friendly outer shell portion and the second environmentally friendly outer shell portion, wherein the window provides a view to contents being stored within the environmentally friendly container.

19. The environmentally friendly container of claim 15, further comprising a corset for strengthening a structural characteristic of the environmentally friendly container, wherein the first environmentally friendly outer shell portion, the second environmentally friendly outer shell portion, and the barrier film piece are constructed with dimensions such that without the corset, a desired shape of the environmentally friendly container could not be maintained.

20. The environmentally friendly container of claim 15, wherein the sealing liner bends at a right angle vertically along a side of the screw cap so that thread portions of the screw cap engage the closure fitment.

*21. The environmentally friendly container of claim 1, further comprising a portal disposed on a base portion of the environmentally friendly container that is accessed to introduce fluid into the container and sealed after introduction of the liquid into the container is complete.*

*22. The environmentally friendly container of claim 1, wherein the environmentally friendly container is self-bundled with at least one other container.*

*23. The environmentally friendly container of claim 22, wherein the container is coupled to the at least one other container along side portions, which are suitably perforated to allow the environmentally friendly container to be separated from the at least one other container.*

*24. The environmentally friendly container or claim 1, further comprising a sealing tube constructed of a similar material as the barrier film piece, wherein the sealing tube is removed after receiving liquid for the environmentally friendly container.*

* * * * *